United States Patent [19]

Hagiwara et al.

[11] Patent Number: 4,591,028
[45] Date of Patent: May 27, 1986

[54] DISC BRAKE HAVING OPPOSITELY SWINGABLE CYLINDER AND CALIPER

[75] Inventors: Yutaca Hagiwara, Kamakura; Terukiyo Kitamura, Tokyo; Hideto Murakami, Hatano, all of Japan

[73] Assignee: Nissan Motor Co., Ltd., Yokohama, Japan

[21] Appl. No.: 669,009

[22] Filed: Nov. 7, 1984

[30] Foreign Application Priority Data

Nov. 16, 1983 [JP] Japan .................. 58-215603

[51] Int. Cl.⁴ .............. F16D 55/14; F16D 55/46; F16D 65/20
[52] U.S. Cl. .................. 188/72.2; 188/73.42; 188/73.47; 188/140 A
[58] Field of Search .............. 188/73.41, 73.42, 72.2, 188/73.47, 73.35–73.38, 73.39, 205, 72.4, 70 B, 70 R, 71.1, 140 A

[56] References Cited

U.S. PATENT DOCUMENTS 3,199,634  8/1965  Chouings ............. 188/73.42
3,935,928  2/1976  Margetts ............. 188/73.47

FOREIGN PATENT DOCUMENTS 1450132  3/1969  Fed. Rep. of Germany .
1425753  2/1976  United Kingdom .

Primary Examiner—Douglas C. Butler
Attorney, Agent, or Firm—Leydig, Voit & Mayer, Ltd.

[57] ABSTRACT

A single brake cylinder for directly loading an inner pad against a disc, and a yoke for indirectly loading an outer pad against the disc are both swingable, respectively, about a cylinder pivot axis and a yoke pivot axis which are both substantially parallel to the disc, and parallel or coincident with each other. When the brake is applied, the cylinder swings in one direction and the yoke swings in the opposite direction in such a manner that the trailing portion of each pad is loaded with a greater force to reduce brake noise.

26 Claims, 34 Drawing Figures

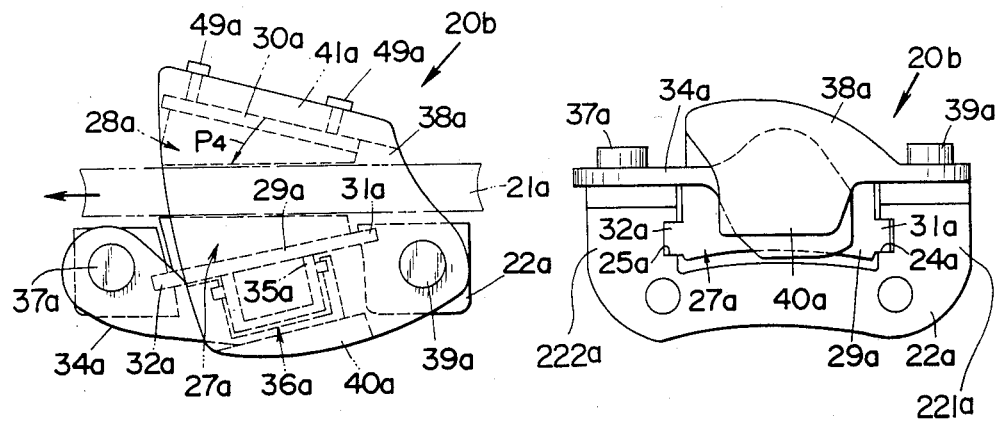

DISC BRAKE HAVING OPPOSITELY SWINGABLE CYLINDER AND CALIPER

BACKGROUND OF THE INVENTION

The present invention relates to disc brakes for motor vehicles and other vehicles.

Brake noise such as brake squeal is one difficult problem in disc brakes, and there is a strong demand for disc brakes having low brake noise.

SUMMARY OF THE INVENTION

It is an object of the present invention to provide a disc brake arranged to reduce brake noise.

According to the present invention, a disc brake comprises a disc, first and second pad assemblies, and nonstationary support means which comprises stationary support member, a swingable yoke (or caliper) and a swingable cylinder member having a brake cylinder actuator. The disc is adapted to rotate together with a vehicle wheel. The first pad assembly comprises a first pad attached to a first backing plate, and the second pad assembly comprises a second pad attached to a second backing plate. The first and second pad assemblies are disposed on opposite sides of the disc so that the first and second pads face each other and the disc rotates between the first and second pads. Each of the first and second pads assemblies has a leading portion and a trailing portion which are so located that the disc rotates between the first and second pads from the leading portion to the trailing portion when the vehicle moves forwards. The nonrotational support means supports the first and second pad assemblies, and has the brake cylinder actuator placed behind the first pad assembly for loading the first pad assembly against the disc directly. The stationary support member is adapted to be fixed to a vehicle body. The swingable yoke is supported on the stationary support member so that the yoke can swing about a yoke pivot axis substantially parallel to the disc. The yoke straddles the disc, and has a first leg lying at such a position that the cylinder actuator is placed between the first pad assembly and the first leg, and a second leg lying behind the second pad assembly for loading the second pad assembly against the disc when the yoke swings about the yoke pivot axis in a yoke swing direction by being pushed at the first leg by the cylinder actuator. The second leg has a leading portion for loading the leading portion of the second pad assembly against the disc and a trailing portion for loading the trailing portion of the second pad assembly against the disc. The trailing portion of the second leg is remoter from the yoke pivot axis than the leading portion of the second leg. The swingable cylinder member is swingably supported on the stationary support member so that the brake cylinder actuator can swing about a cylinder pivot axis substantially parallel to the disc. The brake cylinder actuator swings about the cylinder pivot axis in a cylinder swing direction opposite to the yoke swing direction when the brake cylinder actuator is actuated to load the first pad assembly against the disc and push the first leg to swing the yoke in the yoke swing direction.

BRIEF DESCRIPTION OF THE DRAWINGS

FIGS. 8A, 8B, 8C, 8D and 8E are views showing a disc brake of a third embodiment of the present invention, respectively, in plan, front elevation, rear elevation, right side elevation and left side elevation;

DETAILED DESCRIPTION OF THE INVENTION

Figure 1:
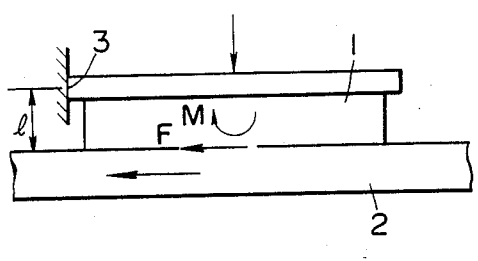
FIGS. 1, 2 and 3 are views for illustrating three causes of brake noise.
Figure 2:
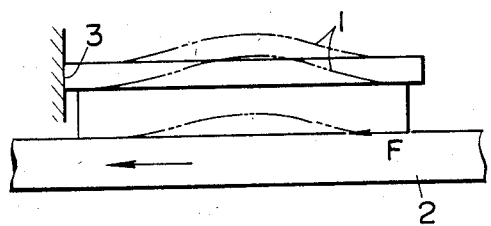
Figure 3:
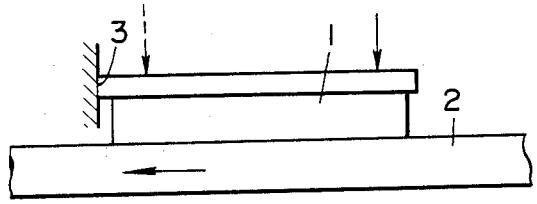

FIGS. 1, 2 and 3 are view illustrating three important causes of brake noise in disc brakes. First, second and third causes are illustrated, respectively, in FIGS. 1, 2 and 3.

An anchor portion 3 shown in FIG. 1 receives a torque due to a frictional force F which is produced when a pad 1 is pressed against a disc 2 rotating from the right to the left in FIG. 1. If the anchor portion 3 is placed on the trailing side of the pad 1 (at the left in FIG. 1) as shown in FIG. 1, the pad 1 receives a moment M which is equal to a product of the frictional force F and a distance l between the anchor portion 3 and the disc 2. This moment M tends to force the leading edge of the pad 1 to dig into the disc 2, so that this disc brake tends to produce brake noise due to so-called stick-slip phenomenon.

As shown in FIG. 2, if the anchor portion 3 is placed on the trailing side of the pad 1, the pad 1 is compressed circumferentially by the frictional force F, so that the pad 1 buckles as shown by two-dot chain lines in FIG. 2. Such a buckling produces brake noise.

As shown in FIG. 3, if a force pressing the leading portion of the pad 1 against the disc 2 is greater than a force pressing the trailing portion of the pad 1, the pad 1 tends to dig into the disc 2 as in the case of FIG. 1, so that brake noise is produced.

Figure 4A:
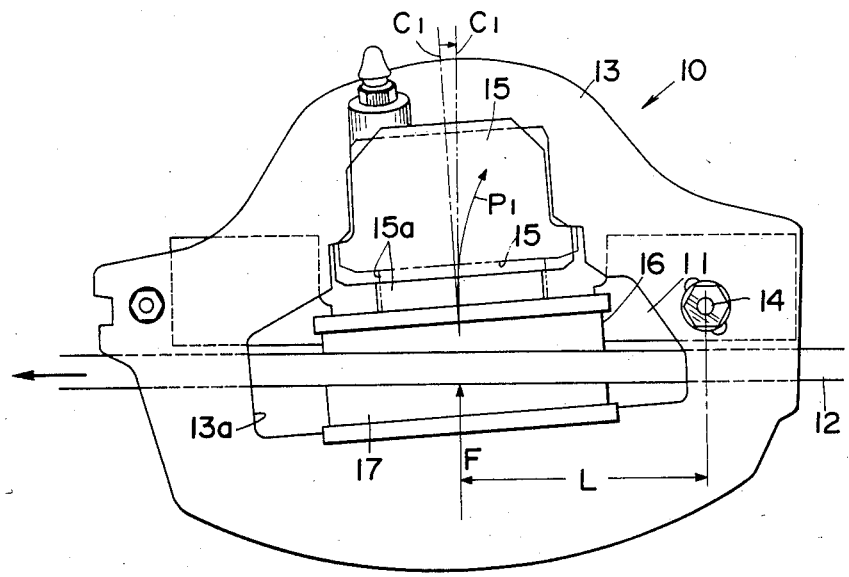
FIGS. 4A and 4B are views showing a disc brake of a conventional type in plan and in a front elevation partly in section, respectively.
Figure 4B:
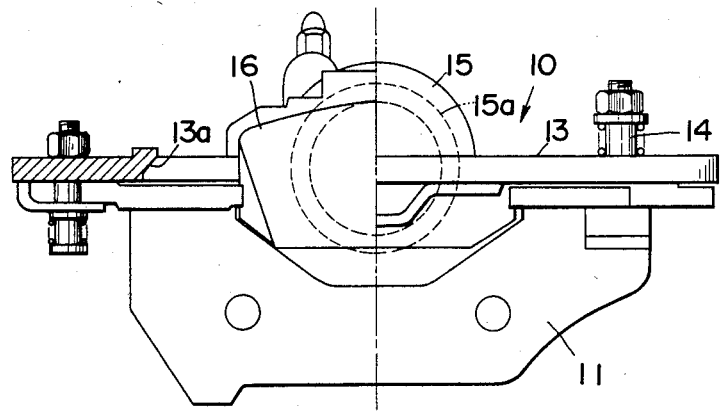

FIGS. 4A and 4B show a conventional type disc brake disclosed in Nissan Service Shuho No. 138 published by Nissan Motor Company in 1967. In this disc brake 10, a yoke 13 straddling a disc 12 is swingably supported through a pivot pin 14 on a stationary support member 11 fixed to a vehicle body. The pivot pin 14 is placed on the leading side (the right side in FIG. 4A) of an inner pad 16. When the brake fluid pressure is supplied to a cylinder disposed in a central opening 13a of the yoke 13, a piston 15a directly loads the inner pad 16 against the disc 12, and at the same time the yoke 13 swings about the pivot axis 14 in a clockwise direction in FIG. 4A by the reaction, and loads an outer pad 17 against the disc 12.

During this braking action, the cylinder 15 rotates about the pivot pin 14 in the same direction as the yoke 13 swings, as shown by an arrow $P_1$, and the axis $C_1$ of the cylinder 15 rotates from a position shown by a one-dot chain line to a position shown by a two-dot chain line. Accordingly, the axis of the piston 15a contained in the cylinder 15 leans toward the leading side, and loads the leading portion of the inner pad 16 with a greater force than the trailing portion. Thus, brake noise is produced for the above-mentioned third reason.

A first embodiment of the present invention is shown in FIGS. 5A, 5B, 5C and 5D.

A disc or rotor 21 of a disc brake 20 is fixed, in use, to a vehicle wheel (not shown) so that the disc 21 rotates together with the vehicle wheel. The disc 21 has two parallel braking surfaces on the opposite sides.

Figure 5A:
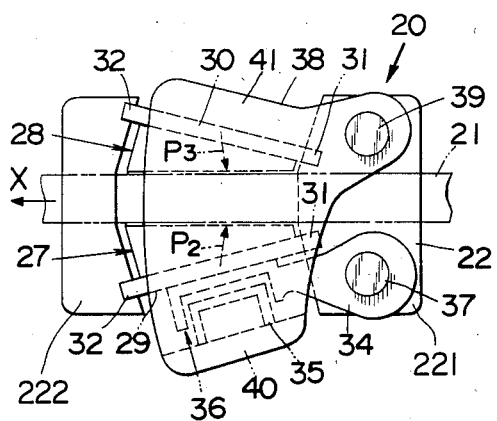
FIGS. 5A, 5B, 5C and 5D are views showing a disc brake of a first embodiment according to the present invention, respectively, in plan, front elevation, rear elevation, right side elevation.

A stationary support member 22 of the disc brake 20 is fixed to a vehicle body (not shown). The stationary support member 22 has a base portion 23 which is fixed to the vehicle body on the inboard side of the disc 21. The stationary member 22 further has a leading bridge portion 221 and a trailing bridge portion 222 each of which extends from the base portion 23 and straddles the periphery of the disc 21. The leading bridge portion 221 is located upstream of the trailing bridge portion 222 with respect to the direction of the disc forward rotation. That is, the disc 21 rotates from the leading bridge portion 221 to the trailing bridge portion 222 when the vehicle is moving forward. In FIG. 5A, an arrow X indicates the direction of the forward disc rotation corresponding to the forward vehicle movement. In FIG. 5A, the leading bridge portion 221 lies on the right, and the trailing bridge portion 222 lies on the left.

Figure 5B:
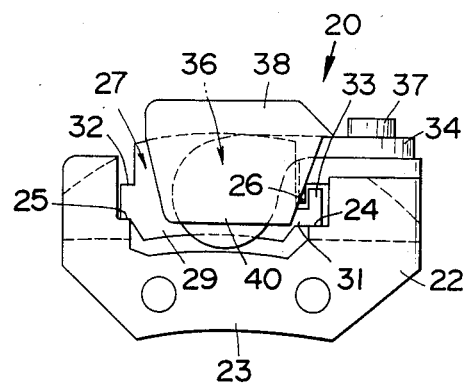
Figure 5C:
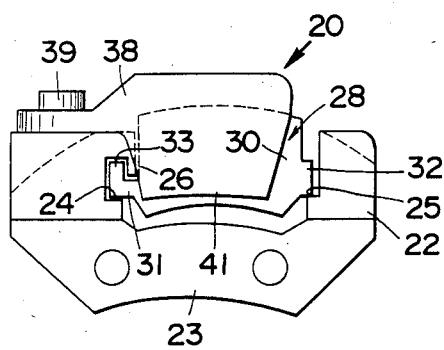
Figure 5D:
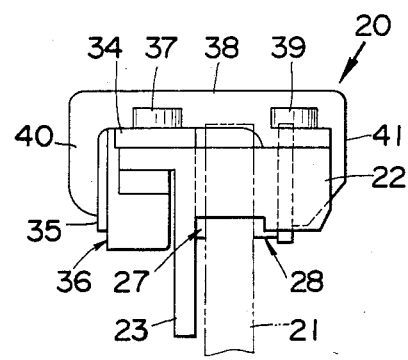

Inner and outer friction pads 27 and 28 are disposed on the opposite sides of the disc 21. The inner pad 27 is on the inboard side of the disc 21, and the outer pad 28 is on the outboard side. The inner and outer pads 27 and 28 are attached to inner and outer backing plates 29 and 30, respectively. Each of an inner pad assembly of the inner pad 27 and the inner backing plate 29, and an outer pad assembly of the outer pad 28 and the outer backing plate 30 is mounted on the stationary member 22 between the leading and trailing bridge portions 221 and 222. Each of the inner and outer backing plates 29 and 30 has a leading tab 31 projecting toward the leading bridge portion 221 and a trailing tab 32 projecting toward the trailing bridge portion 222. The leading bridge portion 221 of the stationary member 22 is formed with inner and outer guide ledges 24. The inner guide ledge 24 is on the inboard side of the disc 21, and the outer guide ledge 24 is on the outboard side of the disc 21. The trailing bridge portion 222 of the stationary member 22 is formed with inner and outer guide ledges 25. The inner guide ledge 25 is on the inboard side of the disc 21, and the outer guide ledge 25 is on the outboard side of the disc 21. The leading and trailing tabs 31 and 32 of the inner backing plate 29 are, respectively, mounted on and guided by the inner guide ledges 24 and 25, in such a manner that the inner pad assembly can slide along the inner guide ledges 24 and 25 between the leading and trailing bridge portions 221 and 222 toward and away from the disc 21. The leading and trailing tabs 31 and 32 of the outer backing plate 30 are, respectively, mounted on and guided by the outer guide ledges 24 and 25 in such a manner that the outer pad assembly can slide along the outer guide ledges 24 and 25 between the leading and trailing bridge portions 22 and 222 toward and away from the disc 21. Each of the leading tabs 31 of the inner backing plate 29 and the outer backing plate 30 has a hooked end 33 angled in a L-shape upwardly as shown in FIGS. 5B and 5C. The leading bridge portion 221 of the stationary member 22 is formed with inner and outer anchor portions 26. The inner anchor portion 26 projects over the inner guide ledge 24 as shown in FIG. 5A, and the outer anchor portion 26 projects over the outer guide ledge 24, as shown in FIG. 5C. Each of the inner and outer anchor portions 26 has a hooked end angled downwardly in a L-shape as shown in FIGS. 5B and 5C. The hooked end 33 of the inner backing plate 29 and the hooked end 33 of the outer backing plate 30 are engaged, respectively with the inner and outer anchor portions 26 of the leading bridge portion 221 so that the anchor portions 26 limit the rotational movements of the inner and outer pads 27 and 28 about the axis of the disc 21, respectively. In this way, the inner and outer anchor portions 26 of the leading bridge portion 221 of the stationary member 22 receive torques acting on the inner and outer pads 27 and 28.

A cylinder member 34 has a brake cylinder 36 containing a piston 35 for actuation of the brake. The cylinder 36 is disposed on the inboard side of the inner backing plate 29 of the inner pad 27. One end of the cylinder member 34 is swingably supported through a first pin 37 on the inboard part of the leading bridge portion 221 of the stationary member 22. The first pin 37 extends substantially in parallel to the braking surfaces of the disc 21. The first pin 37 lies on the leading side of the inner pad 27. The cylinder 36 of the cylinder member 34 can swing about the first pin 37 toward and away from the disc 21. The bottom of the cylinder 36 abuts against the inner backing plate 29 over almost all the area of the bottom of the cylinder 36. The piston 35 projects from the cylinder 36 toward the inboard side.

A yoke 38 straddles the disc 21. The yoke 38 is swingably mounted through a second pin 39 on the leading bridge portion 221 of the stationary member 22 on the outboard side of the disc 21. The second pin 39 lies on the leading side of the outer pad 28, and extends substantially in parallel to the braking surfaces of the disc 21. The second pin 39 is substantially parallel to the first pin 37. The yoke 38 is swingable about the second pin 39. The yoke 38 has an inner leg 40 projecting toward the axis of the disc 21 and lying on the inboard side of the piston 35, and an outer leg 41 projecting toward the axis of the disc 21 and lying on the outboard side of the outer backing plate 30. The inner leg 40 abuts against the projecting end of the piston 35 over almost all the area of the projecting end of the piston 35. The outer leg 41 abuts against the outer backing plate 30 over almost all the area of the outer backing plate 30.

Figure 6:
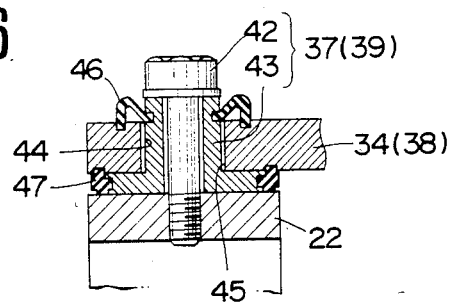
FIG. 6 is an enlarged sectional view of a pivot pin used in the first embodiment and the other embodiments of the present invention.

Each of the first and second pins 37 and 39 comprises a bolt 42 and a sleeve 43 as shown in FIG. 6. The sleeve 43 is fitted in a hole 44 formed in the cylinder member 34 (or the yoke 38), and fixed to the stationary member 22 by the bolt 42. A seal member 46 is provided at an upper end of a clearance 45 between the sleeve 43 and the cylinder member 34 (or the yoke 38). A seal member 47 is provided at a lower end of the clearance 45. The seal members 46 and 47 protects the clearance against mud.

The disc brake 20 of the first embodiment is actuated by supplying a hydraulic brake fluid pressure to the brake cylinder 36. When the fluid pressure is supplied to the cylinder 36, the piston 35 projects from the cylinder 36 and pushes the inner leg 40 of the yoke 38 away from the disc 21 toward the inboard side. As a result, the yoke 38 rotates about the second pin 39 in the counterclockwise direction as viewed in FIG. 5A, and presses the outer pad 28 against the disc 21 with the outer leg 41. At the same time, by the reactive force of the piston 35, the cylinder member 34 rotates about the first pin 37 in the clockwise direction as viewed in FIG. 5A, and presses the inner pad 27 against the disc 21 with the bottom of the cylinder 36. Thus, the inner and outer friction pads 27 and 28 are forced against both braking surfaces of the rotating disc 21. During this braking action, the cylinder member 34 rotates about the first pin 37 in a direction shown by an arrow $P_2$ in FIG. 5A, and the yoke 38 rotates about the second pin 39 in the opposite direction shown by an arrow $P_3$ in FIG. 5A. Therefore, each of the inner and outer pads 27 and 28 is moved toward the disc 21 in such a manner that the length of a circular arc traveled by the trailing side of the pad is greater than the length of a circular arc traveled by the leading side of the pad. Actually, each pad is immediately pressed against the disc 21 because the clearance between the disc 21 and each pad is very small, and accordingly the leading and trailing portions of each pad are pressed against the disc 21 with forces of different magnitudes depending on the difference of travelled distance between the leading and trailing portions. That is, the force pressing the trailing portion of each pad is greater than the force pressing the leading portion of the pad. Thus, the disc brake of the first embodiment reduces the tendency for each pad to dig into the disc by removing the above-mentioned third cause of brake noise, so that the brake noise can be prevented or reduced remarkably.

In the disc brake 20 of the first embodiment, the inner and outer anchor portions 26 formed in the leading bridge portion 221 of the stationary member 22 receive torques which are exerted on the inner and outer pads 27 and 28 when the inner and outer pads are pressed against the disc 21. Therefore, the above-mentioned first and second causes of brake noise are also removed, so that brake noise can be further reduced.

Figure 7A:
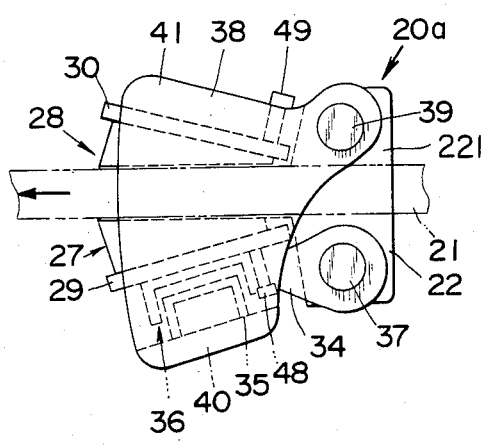
FIGS. 7A, 7B and 7C are views showing a disc brake of a second embodiment of the present invention, respectively in plan, front elevation and rear elevation.
Figure 7B:
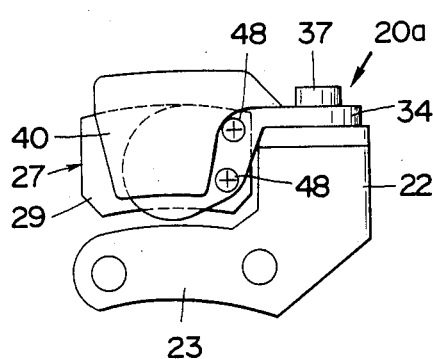
Figure 7C:
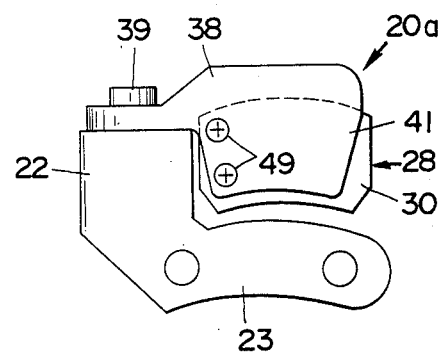

A second embodiment of the present invention is shown in FIGS. 7A, 7B and 7C. In a disc brake 20a of the second embodiment, the inner pad 27 is fixed to the cylinder member 34 by bolts 48, and the outer pad 28 is fixed to the outer leg 41 of the yoke 38 by bolts 49. The fixing of each pad 27 or 28 is one-sided. The bolts 48 are localized in the leading portion of the inner pad assembly adjacent to the leading bridge portion 221, and the inner pad assembly is fixed to the cylinder member 34 only in the leading portion. Similarly, the bolts 49 are localized in the leading portion of the outer pad assembly, and the outer pad assembly is fixed to the outer leg 41 of the yoke 38 only in the leading portion. In the second embodiment, the inner and outer pad assemblies are not mounted on the stationary support member 22, so that the stationary support member 22 has to have neither the trailing bridge portion nor the guide ledges. In other respect, the disc brake of the second embodiment is the same as the disc brake of the first embodiment.

The disc brake of the second embodiment has the same advantageous effects as the disc brake of the first embodiment. In the second embodiment, the inner and outer pad assemblies are not mounted on the stationary support member 22, so that the disc brake of the second embodiment is immune from trouble due to rust between the stationary support member and each pad assembly. The stationary support member 22 of the second embodiment has neither the trailing bridge portion nor the guide ledges, and is formed approximately in a L-shape as shown in FIG. 7B. Therefore, the stationary member of the second embodiment is easy to fabricate, and light in weight.

A third embodiment of the present invention is shown in FIGS. 8A, 8B, 8C, 8D and 8E. A disc brake 20b of the third embodiment has a stationary support member 22a which has a U-shape and is placed on the inboard side of a disc 21a. The stationary support member 22a has a leading inner portion 221a and a trailing inner portion 222a, each of which extends from a base portion of the stationary support member 22a on the inboard side of the disc 21a. The leading inner portion 221a is located upstream of the trailing inner portion 222a with respect to the direction of the disc forward rotation. A cylinder member 34a is swingably supported on the trailing inner portion 222a of the support member 22a through a third pin 37a extending substantially in parallel to the braking surfaces of the disc 21a. A yoke 38a is swingably supported on the leading inner portion 221a of the support member 22a through a fourth pin 39a extending substantially in parallel to the braking surfaces of the disc 21a. The third and fourth pins 37a and 39a are substantially parallel to each other. A brake cylinder 36a is provided at a swingable end of the cylinder member 34a. A piston 35a projects from the cylinder 36a toward the inner pad 27a, and a projecting end of the piston 35a abuts on the inner backing plate 29a of the inner pad 27a over almost all the area of the projecting end of the piston 35a. The bottom of the cylinder 36a abuts on the inner leg 40a of the yoke 38a. The outer pad assembly is fixed to the outer leg 41a of the yoke 38a through bolts 49a, so that the outer pad assembly and the yoke 38a move together. The inner pad assembly is supported by the support member 22a. The inner backing plate 29a of the inner pad 27a has a leading tab 31a projecting toward the leading inner portion 221a and a trailing tab 32a projecting toward the trailing inner portion 222a. The leading and trailing inner portions 221a and 222a of the support member 22a are formed with guide recesses 24a and 25a, respectively. The leading and trailing tabs 31a and 32a are, received and slidably guided by the guide recesses 24a and 25a, respectively. The guide recess 25a formed in the trailing inner portion 222a receives torque exerted on the inner pad assembly by the disc when the disc rotates forwards. The third and fourth pins 37a and 39a are constructed in the same manner as the first and second pins 37 and 39 as shown in FIG. 6.

Figure 9:
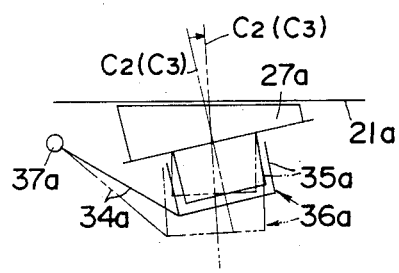
FIG. 9 is a schematic illustration showing the operation of the third embodiment.

When the brake fluid pressure is supplied to the brake cylinder 36a, the piston 35a projects from the cylinder 36a and loads the inner pad 27a directly against the disc 21a while by its reaction the cylinder member 34a rotates about the third pin 37a in the clockwise direction as viewed in the FIG. 8A and pushes the inner leg 40a of the yoke 38a. The yoke 38a rotates about the fourth pin 39a in the counterclockwise direction as viewed in FIG. 8A, and loads the outer pad 28a against the disc 21a with the outer leg 41a. When the cylinder member 34a rotates during this braking action, a center line $C_2$ of the brake cylinder 36a rotates from a position shown by a one-dot chain line in FIG. 9 to a position shown by a two-dot chain line approximately perpendicular to the braking surface of the disc 21a. That is, the angle formed on the leading side between the center line $C_2$ of the cylinder 36a and the braking surface of the disc 21a in a plane in which the center line $C_2$ rotates about the pin 37a increases when the brake is actuated. A center line $C_3$ of the piston 35a coincides with the center line $C_2$ of the cylinder 36a, so that the center line $C_3$ of the piston 35a rotates in the same direction as the center line $C_2$ of the cylinder 36a. Therefore, the piston 35a applies a greater pressing force on the trailing portion of the inner pad assembly, and a smaller pressing force on the leading portion of the inner pad assembly. Thus, the third cause of the brake noise is removed in the inner pad. The outer pad 28a rotates together with the yoke 38a about the fourth pin 39a located on the leading side of the outer pad. Therefore, the trailing portion of the outer pad assembly is loaded with a greater pressing force than the leading portion as in the first and second embodiments. The third cause is removed also in the outer pad.

The third embodiment can also prevent or reduce the brake noise remarkably. The stationary support member 22a of the third embodiment is located only on the inboard side of the disc, so that the disc brake 20c of the third embodiment can be accommodated in a narrower space.

Figure 10:
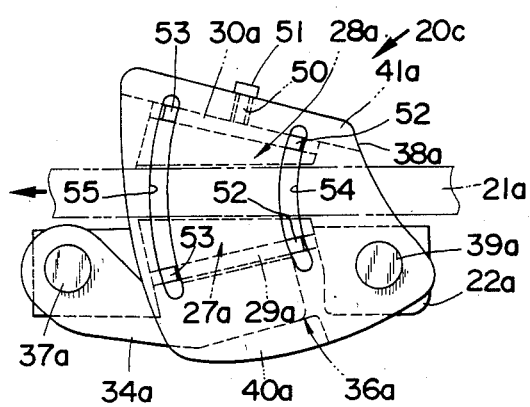
FIGS. 10A, 10B and 10C are views showing a disc brake of a fourth embodiment of the present invention, respectively, in plan, front elevation and rear elevation.
FIGS. 10D and 10E are sectional views of a portion of the disc brake of the fourth embodiment for showing operating conditions.
Figure 10:
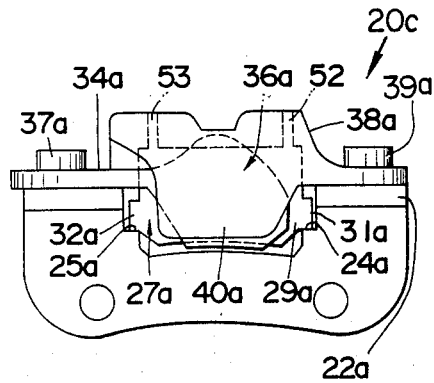
Figure 10:
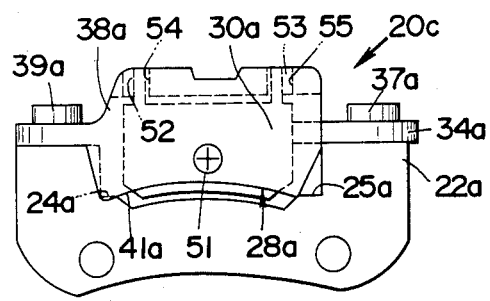
Figure 10:
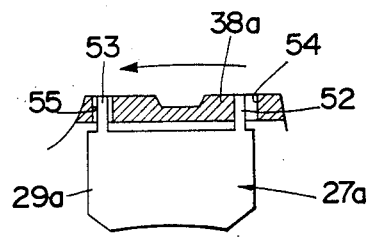
Figure 10:
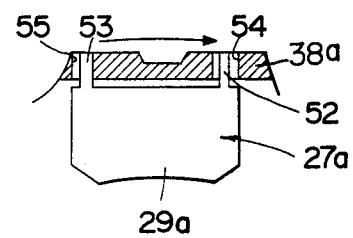

A fourth embodiment of the present invention is shown in FIGS. 10A, 10B, 10C, 10D and 10E. A disc brake 20c of the fourth embodiment is identical with the disc brake 20b of the third embodiment except for the following points. In the fourth embodiment, the outer pad assembly is supported by the outer leg 41a of the yoke 38a through a bolt 51 which is loosely fitted in a hole 50 formed in the outer leg 41a. Each of the inner backing plate 29a and the outer backing plate 30a is formed with a leading projection 52 and a trailing projection 53, both of which project upwardly as shown in FIGS. 10B and 10C. The leading projections 52 of the inner and outer backing plates are received in a leading arc groove 54 formed in the yoke 38a. The trailing projections 53 of the inner and outer backing plates are received in a trailing arc groove 55 formed in the yoke 38a. The leading and trailing arc grooves 54 and 55 are shaped like two concentric circular arcs which are determined by the paths of the inner pad 27a and the yoke 38a. The leading and trailing arc grooves 54 and 55 receive torques exerted on the inner and outer pads 27a and 28a during braking, through the leading and trailing projections 52 and 53. When the vehicle moves forwards, the disc 21a rotates from leading groove 54 to the trailing groove 55 between the inner and outer pads. As shown in FIG. 10D, the rotational movements of the inner and outer pad assemblies about the axis of the disc 21a in the disc forward rotational direction corresponding to the vehicle forward movement are limited only by the leading groove 54. When the brake is applied while the vehicle is moving forwards, the leading projection of each backing plate is pressed against the side wall of the leading groove 54 but the trailing projection of each backing plate is not pressed against the side wall of the trailing groove 55. When the disc 21a rotates in the reverse direction corresponding to the vehicle reverse movement, the inner and outer pad assemblies are limited from rotating about the axis of the disc in the reverse direction only by the trailing groove 55 which is now upstream of the leading groove 54 with respect to the disc reverse rotation, as shown in FIG. 10E.

The fourth embodiment has the same advantageous effects as the third embodiment. Additionally, the fourth embodiment can further reduce the brake noise by removing the first and second causes of the brake noise with the arrangement of the arc grooves 54 and 55 and the projections of the braking plates 29a and 30a.

Figure 11A:
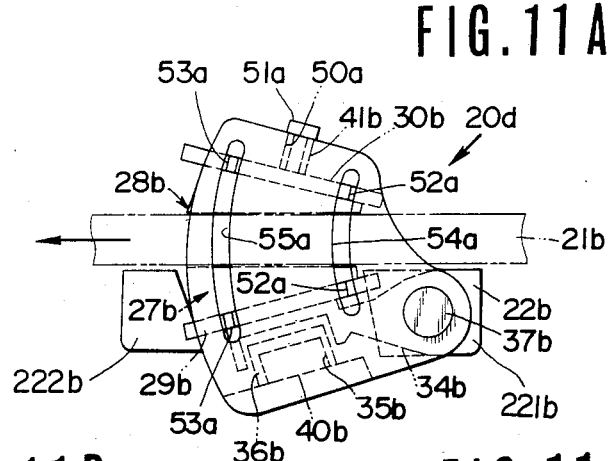
FIGS. 11A, 11B, 11C and 11D are views showing a disc brake of a fifth embodiment of the present invention, respectively, in plan, front elevation, rear elevation and right side elevation.
Figure 11B:
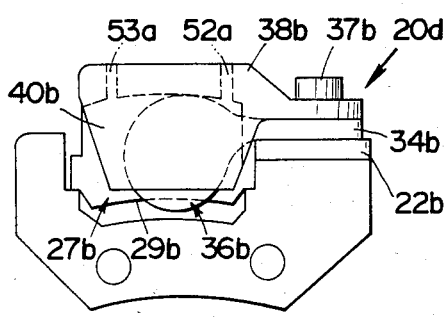
Figure 11C:
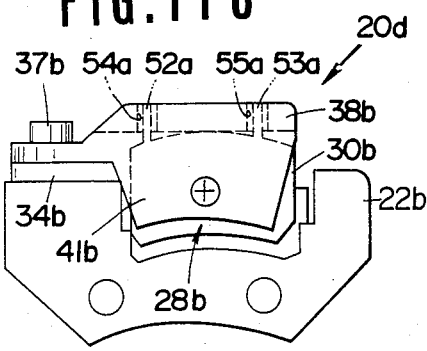
Figure 11D:
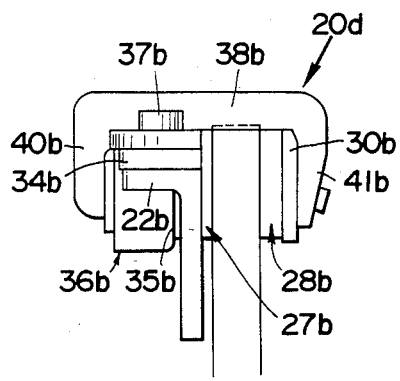
Figure 11E:
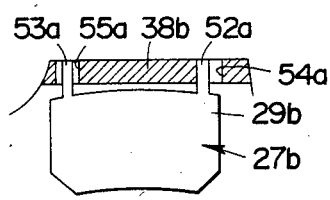
FIGS. 11E and 11F are sectional views of a portion of the disc brake of the fifth embodiment for showing operating conditions.
Figure 11F:
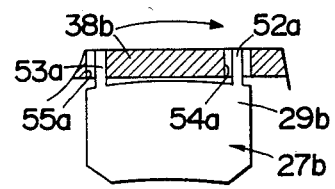
Figure 12:
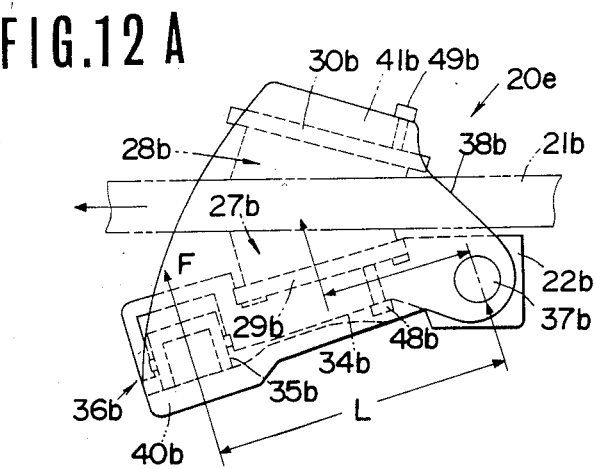
FIGS. 12A, 12B, 12C and 12D are views showing a disc brake of a sixth embodiment of the present invention, respectively, in plan, front elevation, rear elevation and right side elevation.
Figure 12:
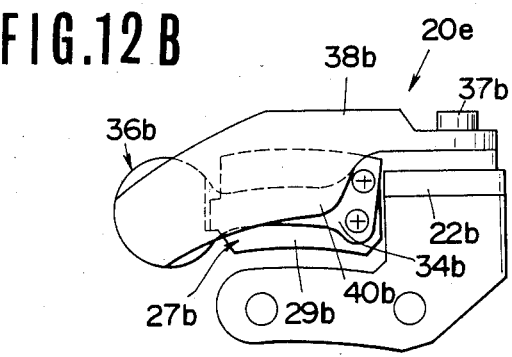
Figure 12:
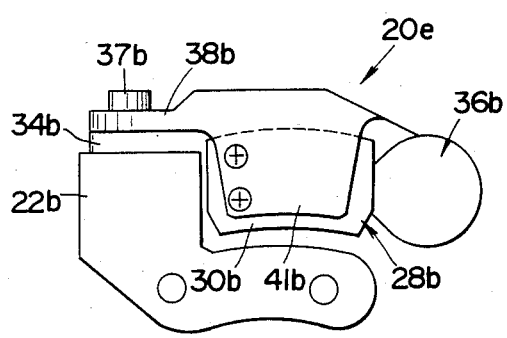
Figure 12:
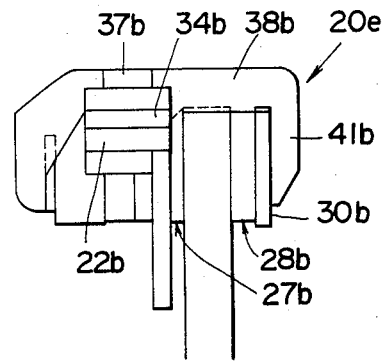

A fifth embodiment of the present invention is shown in FIGS. 11A, 11B, 11C, 11D, 11E and 11F. In a disc brake 20d of the fifth embodiment, a cylinder member 34b and a yoke 38b are swingable, in common, on a fifth pin 37b mounted on a leading inner portion 221b of the stationary support member 22b. As in the third embodiment, the support member 22b of the fifth embodiment has the leading inner portion 221b and a trailing inner portion 222b which do not straddle the disc but lie only on the inboard side of the disc. The bottom of a brake cylinder 34b provided at a swingable end of the cylinder member 34b abuts on the inner backing plate 29b of the inner pad 27b over all the area of the cylinder bottom. The projecting end of the piston 35b abuts on the inner leg 40b of the yoke 38b. The outer pad assembly is supported by the outer leg 41b of the yoke 38b through a bolt 51a loosely fitted in a hole 50a formed in the outer leg 41b as in the fourth embodiment. The bolt 51a does not receive torque exerted on the outer pad 28b because the bolts 51a is loosely fitted in the hole 50a. The same is true of the fourth embodiment. Each of the inner and outer backing plates 29b and 30b has a leading projection 52a received in a leading arc groove 54a formed in the yoke 38a and a trailing projection 53a received in a trailing arc groove 55a formed in the yoke 38a, as in the fourth embodiment. The leading groove 54a receives torques exerted on the inner and outer pads when the disc rotates forwards, as shown in FIG. 11E. The trailing groove 55a receives torques exerted on the inner and outer pads when the disc rotates in the reverse direction as shown in FIG. 11F. The common fifth pin 37b is constructed as shown in FIG. 6.

In the fifth embodiment, the third cause of the brake noise is removed with the arrangement of the cylinder member 36b and the yoke 38b swingable in opposite directions about the common pivot axis lying on the leading side. The first and second causes of the brake noise are removed with the arrangement of the arc grooves and the projections of the backing plates as in the fourth embodiment.

A sixth embodiment of the present invention is shown in FIGS. 12A, 12B, 12C and 12D. A disc brake 20e of the sixth embodiment is different from the disc brake 20d of the fifth embodiment in the following points. A cylinder member 34b of the sixth embodiment is extended beyond the inner pad assembly. The cylinder member 34b has a base swingably connected with the common pin 37b on the leading side of the inner pad assembly, a swingable end having the brake cylinder 36b on the trailing side of the inner pad assembly, and an intermediate portion which lies between the base and the swingable end and abuts on the inner backing plate 29b of the inner pad 27b. The inner leg 40b of the yoke 38b is also extended to the position of the brake cylinder 36b. The projection end of the piston 35b contained in the cylinder 36b abuts on the extended inner leg 40b of the yoke 38b. The inner pad assembly is fixed to the cylinder member 34b by bolts 48b, and the outer pad assembly is fixed to the outer leg 41b of the yoke 38b by bolts 49b. The bolts 48b and 49b are localized in the leading portions of the inner and outer backing plates 29b and 30b, respectively, as in the second embodiment. Torques exerted on the inner and outer pads 27b and 28b are received by the bolts 48b and 49b on the leading side.

The sixth embodiment has the same advantageous effects as the fifth embodiment. In the sixth embodiment, the perpendicular distance L from the axis of the pivot pin 37b to the axis of the brake cylinder 36b is large as compared with the preceding embodiments, so that the mechanical advantage of a lever can be obtained. Therefore, sufficient pressing forces for the inner and outer pads 27b and 28b can be obtained with the brake cylinder 36b of a smaller diameter. The pressing forces for the inner and outer pads 27b and 28b can be adjusted accurately by adjusting the distance L. The brake cylinder 36b of the sixth embodiment is spaced from the inner pad assembly. Therefore, the transfer of a frictional heat produced between the inner pad 27b and the disc 21b is limited so that it is easier to prevent the temperature of the brake fluid from reaching its boiling point and to prevent vapor lock from occurring.

What is claimed is:

1. A disc brake for a vehicle, comprising:
   a disc adapted to rotate together with a vehicle wheel,
   a first pad assembly comprising a first pad attached to a first backing plate and a second pad assembly comprising a second pad attached to a second backing plate, said first and second pad assemblies being disposed on opposite sides of said disc so that said first and second pads face each other and said disc rotates between said first and second pads, each of said first and second pad assemblies having a leading portion and a trailing portion which are so located that said disc rotates between said first and second pads from said leading portion to said trailing portion when the vehicle moves forwards, and
   nonrotational support means supporting said first and second pad assemblies and having a brake cylinder actuator placed behind said first pad assembly for loading said first pad assembly against said disc directly, said nonrotational support means comprising
   a stationary support member adapted to be fixed to a vehicle body,
   a swingable yoke supported on said stationary support member so that said yoke can swing about a yoke pivot axis substantially parallel to said disc, said yoke straddling said disc and having a first leg lying at such a position that said cylinder actuator is placed between said first pad assembly and said first leg, and a second leg lying behind said second pad assembly for loading said second pad assembly against said disc when said yoke swings about said yoke pivot axis in a yoke swing direction by being pushed at said first leg by said cylinder actuator, said second leg having a leading portion for loading said leading portion of said second pad assembly against said disc and a trailing portion for loading said trailing portion of said second pad assembly against said disc, said trailing portion of said second leg being more remote from said yoke pivot axis than said leading portion of said second leg, and
   a swingable cylinder member having said brake cylinder actuator, said cylinder member being swingably supported on said stationary support member so that said brake cylinder actuator can swing about a cylinder pivot axis substantially parallel to said disc, said brake cylinder actuator swinging about said cylinder pivot axis in a cylinder swing direction opposite to said yoke swing direction when said brake cylinder actuator is actuated to load said first pad assembly against said disc and push said first leg to swing said yoke in said yoke swing direction.

2. A disc brake according to claim 1, wherein said yoke and cylinder pivot axes are substantially parallel to each other.

3. A disc brake according to claim 1, wherein each of said first and second backing plates is inclined with respect to said disc in such a direction that its leading portion is closer to said disc than its trailing portion at least before said first and second pads are worn away.

4. A disc brake according to claim 1, wherein an axis of said brake cylinder actuator, if extended, intersects said disc at an intersecting point, which moves in a direction substantially opposite to the rotational direction of said disc corresponding to the vehicle forward movement when said cylinder member and said brake cylinder actuator swing about said cylinder pivot axis in said cylinder swing direction.

5. A disc brake according to claim 1, wherein said brake cylinder actuator comprising a cylinder having a bottom end abutting against said first backing plate, and a piston having a projecting end capable of abutting against said first leg of said yoke, said cylinder pivot axis being placed on the leading side of said first pad assembly so that said leading portion of said first pad assembly is closer to said cylinder pivot axis than said trailing portion of said first pad assembly.

6. A disc brake according to claim 5, wherein said first and second pad assemblies are both mounted directly on said stationary support member.

7. A disc brake according to claim 6, wherein said stationary support member has anchor means which lies on the leading side of said first and second pad assemblies, and limits the rotational movements of said first and second pad assemblies about the axis of said disc during the disc forward rotation corresponding to the vehicle forward movement.

8. A disc brake according to claim 7, wherein said cylinder pivot axis is located on a first side of said disc on which said first pad assembly is placed, and said yoke pivot axis is located on a second side of said disc on which said second pad assembly is placed.

9. A disc brake according to claim 8, wherein said stationary support member has a base portion located on the first side of said disc and adapted to be fixed to the vehicle body, and leading and trailing bridge portions extending from said base portion and straddling said disc, said first and second pad assemblies being disposed between said leading and trailing bridge portions, said leading and trailing bridge portions being so located that said disc rotates from said leading bridge portion to said trailing bridge portion between said first and second pads when the vehicle moves forwards, said anchor means being formed in said leading bridge portion.

10. A disc brake according to claim 8, wherein said anchor means comprises a first hooked projection which is formed in said leading bridge portion and engaged with a hooked portion formed in said first backing plate and a second hooked projection which is formed in said leading bridge portion and engaged with a hooked portion formed in said second backing plate, and wherein said leading bridge portion is formed with a first guide on the first side and a second guide on the second side, and said trailing bridge portion is formed with a first guide on the first side and a second guide on the second side, said first pad assembly being slidable toward and away from said disc on said first guides of said leading and trailing bridge portions, said second pad assembly being slidable toward and away from said disc on said second guide of said leading and trailing bridge portions.

11. A disc brake according to claim 1, wherein said yoke is swingably supported on said stationary support member by yoke pivot means which comprises a sleeve inserted in a hole formed in said yoke, a bolt fitted in said sleeve for fixing said sleeve to said stationary support member and a pair of seals for sealing a clearance formed between said yoke and said sleeve, and said cylinder member is swingably supported on said support member by cylinder pivot means which comprises a sleeve inserted in a hole formed in said cylinder member, a bolt fitted in said sleeve for fixing said sleeve to said stationary support member and a pair of seals for sealing a clearance formed between said sleeve and said cylinder member.

12. A disc brake according to claim 5, wherein said first pad assembly is supported by said cylinder member and said second pad assembly is supported by said second leg of said yoke.

13. A disc brake according to claim 12, wherein said first pad assembly is fixed to said cylinder member only in said leading portion of said first pad assembly by first fastening means lying near to a leading side border of said first backing plate, and said second pad assembly is fixed to said second leg of said yoke only in said leading portion of said second pad assembly by second fastening means lying near to a leading side border of said second backing plate.

14. A disc brake according to claim 13, wherein said cylinder pivot axis is located on a first side of said disc on which said first pad assembly is placed, and said yoke pivot axis is located on a second side of said disc on which said second pad assembly is placed.

15. A disc brake according to claim 1, wherein said brake cylinder actuator comprises a cylinder having a bottom end abutting against said first leg of said yoke and a piston having a projecting end abutting against said first backing plate, said cylinder pivot axis being placed on the trailing side of said first pad assembly so that said leading portion of said first pad assembly is more remote from said cylinder pivot axis than said trailing portion of said first pad assembly.

16. A disc brake according to claim 15, wherein said first pad assembly is supported on said stationary support member and said second pad assembly is supported by said second leg of said yoke.

17. A disc brake according to claim 16, wherein said cylinder pivot axis and said yoke pivot axis are both placed on a first side of said disc on which said first pad assembly is placed.

18. A disc brake according to claim 17, wherein said second pad assembly is fixed to said second leg of said yoke, and said first pad assembly is slidable toward and away from disc on guides formed in said stationary support member.

19. A disc brake according to claim 17, wherein each of said first and second backing plates has a leading projection formed in said leading portion and a trailing projection formed in said trailing portion, and said yoke has a leading groove receiving said leading projections of said first and second backing plates and a trailing groove receiving said trailing projections of said first and second backing plates, said leading and trailing grooves being so shaped that said first and second backing plates can slide toward and away from said disc, said leading and trailing grooves being so dimensioned that said leading groove limits said first and second pad assemblies from moving in the disc forward rotational direction and said trailing groove limits said first and second pad assemblies from moving in the disc reverse rotational direction opposite to the disc forward rotational direction.

20. A disc brake according to claim 19, wherein said second pad assembly is connected with said second leg of said yoke by a bolt which is loosely fitted in a hole formed in said second leg of said yoke.

21. A disc brake according to claim 5, wherein said cylinder pivot axis and said yoke pivot axis coincide with each other.

22. A disc brake according to claim 21, wherein said cylinder and yoke pivot axes are placed on a first side of said disc on which said first pad assembly is placed.

23. A disc brake according to claim 22, wherein each of said first and second backing plates has a leading projection formed in said leading portion and a trailing projection formed in said trailing portion, and said yoke has a leading groove receiving said leading projections of said first and second backing plates and a trailing groove receiving said trailing projections of said first and second backing plates, said leading and trailing grooves being so shaped that said first and second backing plates can slide toward and away from said disc, said leading and trailing grooves being so dimensioned that said leading groove limits said first and second pad assemblies from moving in the disc forward rotational direction and said trailing groove limits said first and second pad assemblies from moving in the disc reverse rotational direction opposite to the disc forward rotational direction.

24. A disc brake according to claim 1, wherein said cylinder pivot axis is placed on the leading side of said first pad assembly so that said leading portion of said first pad assembly is closer to said cylinder pivot axis than said trailing portion of said first pad assembly, and said brake cylinder actuator is placed on the trailing side of said first pad assembly, said cylinder member extending from said cylinder pivot axis to said brake cylinder actuator and having an intermediate portion which lies between said cylinder pivot axis and said brake cylinder actuator and abuts on said first backing plate of said first pad assembly, said brake cylinder actuator comprising a cylinder and a piston having a projecting end capable of abutting against said first leg of said yoke.

25. A disc brake according to claim 24, wherein said cylinder pivot axis and said yoke pivot axis coincide with each other, and lie on a first side of said disc on which said first pad assembly is placed.

26. A disc brake accordin to claim 25, wherein said first pad assembly is fixed to said intermediate portion of said cylinder member only in said leading portion of said first pad assembly by first fastening means, and said second pad assembly is fixed to said second leg of said yoke only in said leading portion of said second pad assembly by second fastening means.

* * * * *